(12) United States Patent
Habuka et al.

(10) Patent No.: US 7,847,823 B2
(45) Date of Patent: Dec. 7, 2010

(54) MOTION VECTOR CALCULATION METHOD AND HAND-MOVEMENT CORRECTION DEVICE, IMAGING DEVICE AND MOVING PICTURE GENERATION DEVICE

(75) Inventors: Kensuke Habuka, Tokyo (JP); Masaki Hiraga, Tokyo (JP)

(73) Assignee: Morpho, Inc., Tokyo (JP)

( * ) Notice: Subject to any disclaimer, the term of this patent is extended or adjusted under 35 U.S.C. 154(b) by 557 days.

(21) Appl. No.: 11/795,218

(22) PCT Filed: Jan. 14, 2005

(86) PCT No.: PCT/JP2005/000424

§ 371 (c)(1), (2), (4) Date: Nov. 5, 2007

(87) PCT Pub. No.: WO2006/075394

PCT Pub. Date: Jul. 20, 2006

(65) Prior Publication Data

US 2008/0180535 A1 Jul. 31, 2008

(51) Int. Cl.
H04N 5/228 (2006.01)
H04N 5/14 (2006.01)
H04N 9/64 (2006.01)

(52) U.S. Cl. .................................. 348/208.4; 348/699

(58) Field of Classification Search ........................ None
See application file for complete search history.

(56) References Cited

U.S. PATENT DOCUMENTS 6,122,004 A * 9/2000 Hwang .................. 348/208.13
6,639,944 B1 * 10/2003 De Haan et al. ......... 375/240.17
7,239,342 B2 * 7/2007 Kingetsu et al. .......... 348/208.4
7,499,494 B2 * 3/2009 Nair et al. ............... 375/240.16
2002/0015574 A1 * 2/2002 Suito et al. .................... 386/46
2002/0085114 A1 * 7/2002 Ojo et al. ..................... 348/452

(Continued)

FOREIGN PATENT DOCUMENTS

JP 06-153146 5/1994

(Continued)

OTHER PUBLICATIONS

Reuter "A Modified Blockmatching Algorithm with Vector Reliability Checking and Adaptive Smoothing". Image Processing and its Applications, 1989, Third International Conference on Jul. 18-20, 1989.*

(Continued)

*Primary Examiner*—Tuan Ho
*Assistant Examiner*—Jason A Flohre
(74) *Attorney, Agent, or Firm*—Muramatsu & Associates

(57) ABSTRACT

A motion vector calculation method includes: processing for calculating multi-resolution data up to a predetermined resolution level L from a plurality of inputted image data; and processing for estimating motion vectors per resolution executing a matching step for temporarily calculating motion vectors minimizing an energy function within a predetermined range of the input motion vectors and a smoothing step for finally calculating the motion vectors by averaging the surrounding data. By using the motion vectors of the resolution level L finally calculated as input motion vectors of a further higher resolution level L-1, the processing for estimating motion vectors per resolution is successively repeated on image data of a high resolution, thereby calculating the motion vectors.

6 Claims, 16 Drawing Sheets

U.S. PATENT DOCUMENTS

2003/0086498 A1* 5/2003 Lee et al. ............... 375/240.16
2005/0163348 A1* 7/2005 Chen ......................... 382/107
2005/0249426 A1* 11/2005 Badawy ..................... 382/241

FOREIGN PATENT DOCUMENTS

| JP | 06-311502 | 11/1994 |
| JP | 07-154801 | 6/1995 |
| JP | 09-073540 | 3/1997 |
| JP | 10-341445 | 12/1998 |
| JP | 2003-078807 | 3/2003 |

OTHER PUBLICATIONS

Morimoto et al. "Fast Electronic Digital Image Stabilization for Off-Road Navigation", 1996, Academic Press.

Olukayode et al. "Robust Motion-Compensated Video Upconversion", 1997, IEEE.

* cited by examiner

FIG. 3 (a)
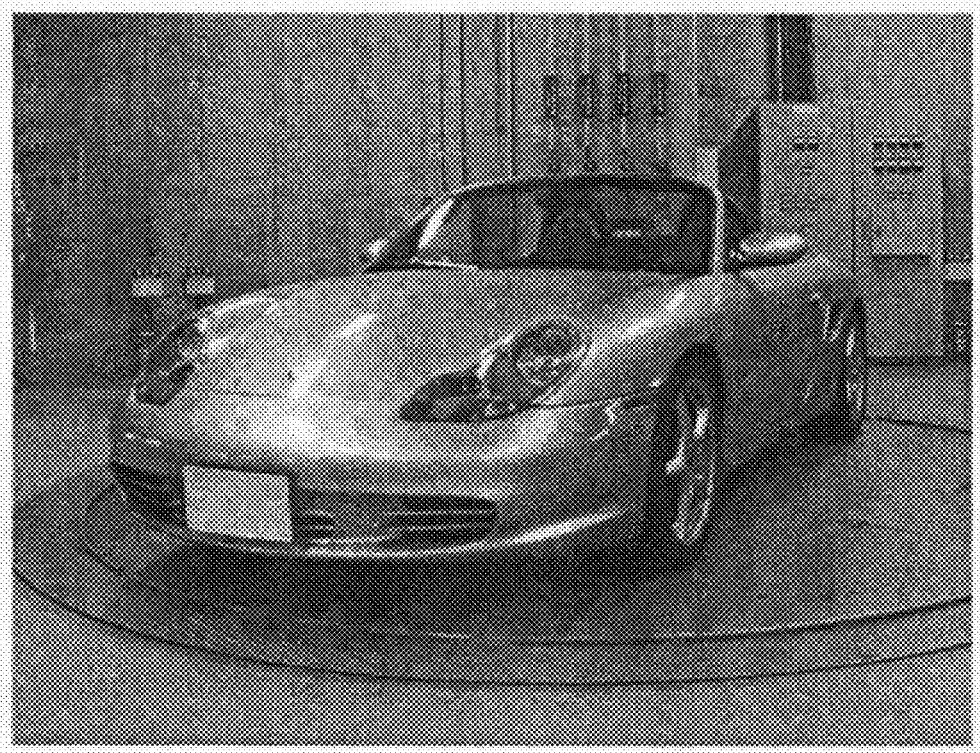
(b)
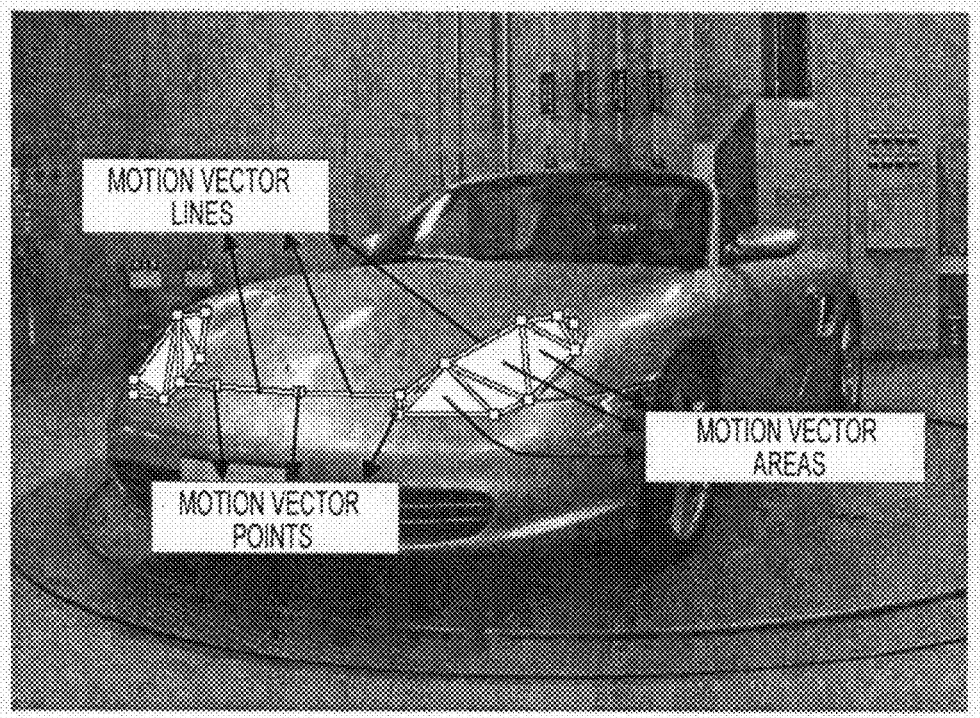

FIG. 4

MOTION VECTOR MESH DATA FILE (a)

MOTION VECTOR MESH DATA POINTS

| POINT ID | COORDINATES (x, y) | MOTION VECTORS (dx, dy) | DETERMINED FLAG (fp) |
|---|---|---|---|
| p1 | (x1, y1) | (dx1, dy1) | 1 |
| p2 | (x2, y2) | (dx2, dy2) | 1 |
| ⋮ | | | |

(b)

MOTION VECTOR MESH DATA LINES

| LINE ID | POINTERS | DETERMINED FLAG (fe) |
|---|---|---|
| e1 | p1   p2 | 1 |
| e2 | p2   p3 | 0 |
| ⋮ | | |

(c)

MOTION VECTOR MESH DATA AREAS

| AREA ID | POINTERS (LINES) | DETERMINED FLAG (fr) |
|---|---|---|
| r1 | e1   e2   ···   en | 0 |
| ⋮ | | |

| AREA ID | POINTERS (POINTS) | DETERMINED FLAG (fr) |
|---|---|---|
| r2 | p1   p2   ···   pn | 0 |
| ⋮ | | |

FLOWCHART OF MULTI-RESOLUTION GENERATION PROCESSING

FIG. 6
RESOLUTION LEVEL (L)
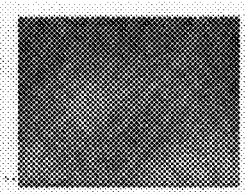
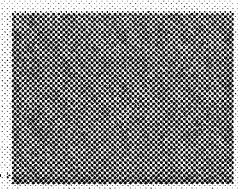
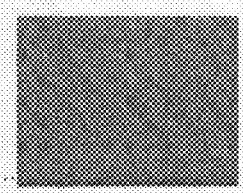
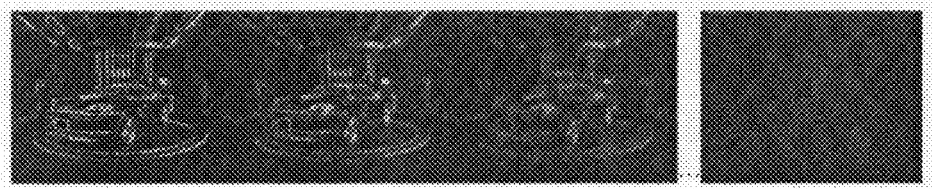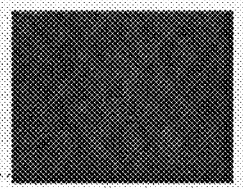

FIG. 7
(a)
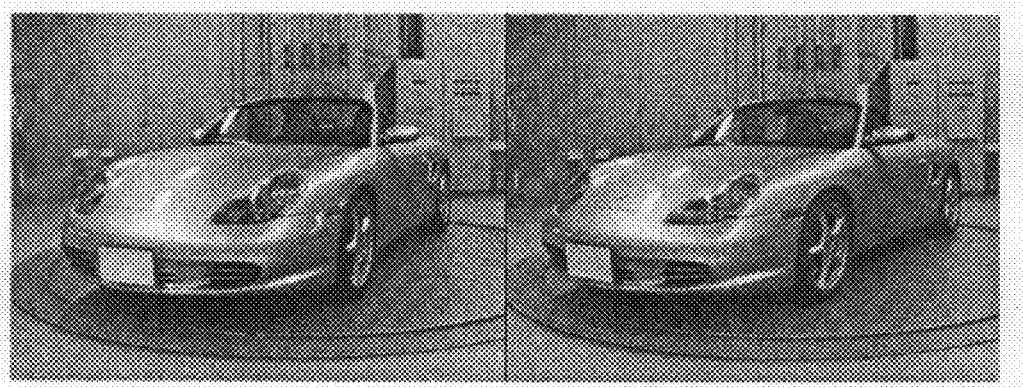
(b)
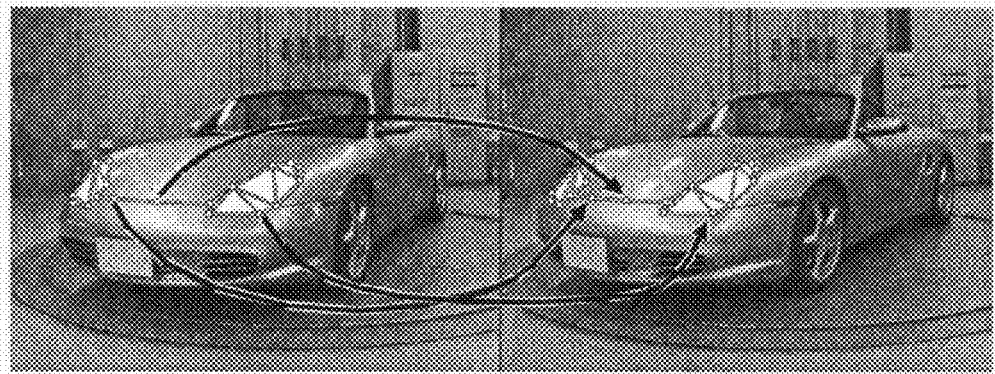

FLOWCHART OF MATCHING PROCESSING (FOR TWO IMAGES)

FLOWCHART OF MATCHING PROCESSING (FOR M IMAGES)

FIG. 19

| ELAPSED TIME | MOVING PICTURE DATA |
|---|---|
| 0.00 s | INPUT IMAGE DATA 1 |
| 0.05 s | MIDDLE MOTION VECTOR 11 |
| 0.10 s | MIDDLE MOTION VECTOR 12 |
| ⋮ | ⋮ |
| 1.00 s | INPUT IMAGE DATA 2 |
| 1.05 s | MIDDLE MOTION VECTOR 21 |
| 1.10 s | MIDDLE MOTION VECTOR 22 |
| ⋮ | ⋮ |
| n.00 s | INPUT IMAGE DATA n+1 |

MOTION VECTOR CALCULATION METHOD AND HAND-MOVEMENT CORRECTION DEVICE, IMAGING DEVICE AND MOVING PICTURE GENERATION DEVICE

This application is a U.S. national stage entry of International Patent Application No. PCT/JP2005/000424, filed Jan. 14, 2005, the entire contents of which are incorporated herein by reference.

TECHNICAL FIELD

The present invention relates to a technology for calculating motion vectors between/among multiple images and, in particular, to a hand-movement correction device, imaging device and moving picture generation device employing the technology.

BACKGROUND ART

Conventionally, a large amount of moving picture data is reduced by calculating motion vectors between reference frames and generating moving picture data with the motion vectors and the reference images.

On the other hand, a technology has been disclosed for correcting a hand-movement blur by calculating motion vectors between multiple still images shot by an imaging device such as a camera by, for example, Japanese Patent Application Laid-Open Publication No. 2003-78807.

The reliability of motion vectors must be increased in order to reproduce the moving picture more accurately and/or correcting the hand-movement blur in shooting. As a technology for increasing the reliability of motion vectors, processing by handling highly correlated motion vectors as those with high reliability is performed as disclosed by Japanese Patent Application Laid-Open Publication Nos. 9-73540, 6-311502, and 6-153146, respectively.

Furthermore, as a technology for maintaining the accuracy of motion vectors and reducing the data amount more at the same time, there is one that identifies feature points of images and calculates motion vectors of the feature points, or there is one that constructs polygons by connecting the feature points, realizes how the polygons are deformed by the movement of the feature points among the target images and estimates the positions where the other points are moved as disclosed by, for example, Japanese Patent Application Laid-Open Publication Nos. 11-506576 and 10-341445, respectively.

DISCLOSURE OF INVENTION

Problem to be Solved by the Invention

In the meantime, when the function for generating motion vectors is implemented by not special hardware but with a normal computer having calculation functions, it becomes an issue how a load on the computer can be reduced while calculating motion vectors with high accuracy at the same time.

The present invention was made in view of the issue, and it is an object of the present invention to provide a motion vector calculation method which can calculate motion vectors with high accuracy by simpler processing with a smaller amount of data and less load on a computer, and allow the correction of a hand-movement blur in photo-shooting and the generation of high quality photographs, and to provide a hand-movement correction device, an imaging device and a moving picture generation device that employ this method.

Means for Solving Problems

In order to achieve the object, there is provided a motion vector calculation method in which multiple pieces of image data are input to calculate motion vectors between/among images, the method including multi-resolution image generation processing for calculating and storing multi-resolution data up to a predetermined resolution level L (where L is a natural number) of the input multiple pieces of image data, input motion vector calculation processing for calculating input motion vectors for the resolution level L of a reference image, and processing for estimating motion vectors per resolution by using the reference image, target image and the input motion vectors at the resolution level L calculated by the processings above to perform:

a step (1) of defining an energy function on each starting point coordinate of the input motion vectors by handling the coordinates on the reference image and a coordinate on the target image as arguments, and temporarily calculating motion vectors, within predetermined range from the input motion vectors, based on the energy function;

a step (2) of temporarily calculating the reliability of the motion vectors based on a feature amount of an image at each feature point of the reference image;

a step (3) of calculating the correlation by using at least one of a difference in the feature amount of the image and a difference in the temporarily calculated motion vectors between feature points of the reference image; and a step (4) of finally calculating motion vectors of the resolution level L by smoothing the temporarily calculated motion vectors and the reliability by using the motion vectors, the reliability and the correlation in predetermined ranges, wherein the motion vectors between the reference image and the target image are calculated by using the finally calculated motion vectors of the resolution level L as input motion vectors of a resolution level L-1, which is a higher resolution, and by repeating the processing for estimating motion vectors per resolution on image data having higher resolutions sequentially.

Summarizing the main characteristics of the present invention, the accuracy of the calculation of motion vectors is enhanced not by calculating the final target motion vectors directly but by performing matching processing (which are the steps (1) to (3) above) for determining temporary motion vectors between images and, at the same time, calculating two parameters of the reliability and correlation, by performing smoothing processing (which is the step (4) above) for smoothing based on the motion vector information of an area (i.e. the surroundings), and by sequentially repeating the above two processings on images from ones of a lower resolution to ones of a higher resolution in different image spaces at different resolutions.

The term, reliability, refers to how much a given motion vector is reliable or how much a given motion vector satisfies a predetermined condition. The reliability may depend on a feature amount of the image, which is a value or function based on an image such as the strength of the edge (boundary) or the corner angle detected from a color space of the image. The reliability of the motion vectors on the feature points (or lines or areas) should be increased based on the information above, since the information indicates a feature amount of the image.

Alternatively, the feature amount of the image may be defined as a function using the energy during the matching processing stage (such as the inverse of the energy), a function returning 0 at the part estimated as an occlusion and 1 at the other part or a function specified by a user. Here, the function may include one for deriving a corresponding numerical value with reference to a table and is not limited to an equation.

The reliability can be expressed by any one of the feature amounts of the image or an arbitrary combination (such as multiplication and addition) of feature amounts of the image.

The term, "correlation", refers to estimated degree showing how two points move in the same direction, which may be determined by a difference from surrounding motion vectors, for example. However, not limiting thereto, the correlation may be expressed by a difference at feature amount of the image such as a color difference between two points on a reference image, a function based on a difference in feature of images by using a Gabor filter, a function using the cutting lines (contour) manually specified by a user, a function based on a difference in temporary motion vector values or linear combination of any functions.

The feature amount of image to be used for correlation calculations may be different from the feature amount of image to be used for reliability calculations.

More specifically, each element of an input image has RGB values about all coordinates (x,y), and each element I(x,y) is expressed as:

$$I(x,y)=(R(x,y), G(x,y), B(x,y))$$

Each element of all coordinates of an image at a resolution level L has multiple pieces of color information and may have information such as (La*b* color space, YUV color space, edge image, corner emphasized image). The resolution level 0 corresponds to the original image, and as a resolution level L is increased, an image at the level becomes more blurred compared to the original image. Each element of the resolution level L may be expressed by $I_L(x,y)$.

Each element of motion vectors includes a starting coordinate (x,y) and a vector v(x,y) of a movement from the starting coordinate. The reason for having starting position information is that all coordinates (x,y) do not always have a motion vector.

Motion vectors may include "grid type motion vectors" having each motion vector for the starting coordinates arranged in a grid pattern and "point group type motion vectors" having a motion vector only for each of feature points.

Motion vectors of the resolution level L are obtained by down-sampling motion vector information in accordance with the resolution level L. For example, the "grid type motion vectors" have each element: ((x,y), v(x,y)) of movement information for each 2^L pixels where "^" denotes a power.

In motion vector estimation processing where the number of images is M (where M is an integer of 2 or higher), an energy function E(sx,sy,tx,ty) is defined by handling the coordinates (sx,sy)=(x,y) on a reference image and the coordinates (tx,ty)=((x,y)+v'(x,y)) on an (M-1)th target image as arguments for each starting coordinates (x,y) of motion vectors, and the motion vector v'(x,y) which minimizes the energy E is searched within the surroundings R of the input motion vector v(x,y). An example of the energy function E may be the square of a difference in color value between the starting point and end point or the sum of the square of the difference in color value within a block (block match).

The reliability of each motion vector v(x,y) is expressed by r(x,y) and, for example, have a value between 0 and 1.

The correlation between motion vectors v(x1,y1) and v(x2,y2) is expressed by a(x1,y1,x2,y2) and, for example, have a value between 0 and 1.

Now, the concepts of the correlation and reliability will be described by using the grid type motion vector case as an example, and with reference to FIG. 1.

In FIG. 1, the starting position (x,y), a motion vector v(x,y) and reliability r(x,y) are provided on each grid point of a reference image. The correlation a(x1,y1,x2,y2) is provided for each of arbitrary two points (or a line segment determined by the two points).

Then, on the reference image, the reliability of a motion vector on the grid point having a higher feature amount (such as the edge and corner) is defined to have a higher value. Furthermore, the correlation of two motion vectors is defined to have a lower value when the difference in color is large on the reference image and the difference in the temporary motion vectors (temporarily calculated motion vectors) is large.

Defining the reliability and correlation in this way, on the discontinuous movement place indicated by the broken line A in FIG. 1, the reliability of the motion vector is increased at the corner or edge part of the image and the correlation between motion vectors across the discontinuous place is decreased. In FIG. 1, the circle symbols are grid points, and the thickness of the circle symbols represents the degree of the reliability. B and E in the figure indicate the reliability associated with the grid points. E has high reliability, since it is on the edge. B has low reliability since it is not on a corner or on an edge. C and D in the figure indicate the correlation between grid points. C has a high correlation since the difference in motion vectors is small. D has a low correlation, since the difference in motion vectors is large.

In the present invention, motion vectors are finally calculated by a matching step of temporarily calculating motion vectors having the above defined reliability and correlation as parameters and a smoothing step of adjusting the temporarily defined motion vectors by calculating a weighed average or an affine parameter by least square method in consideration of motion vectors in a predetermined range. Then this can be performed by so-called repetitive calculation from an image of a lower resolution to an image of a higher resolution sequentially. Thus, according to the present invention, motion vectors with high accuracy can be calculated without imposing a load on a computer therefor.

A motion vector calculation method according to the present invention includes processing for inputting specification information relating to feature points of a reference image. In this case, motion vectors between the reference image and a target image are calculated based on the input specification information.

According to the present invention, motion vectors are calculated first based on the feature points specified by a user and the motion vectors are fixed, then other motion vectors are calculated based on the fixed motion vectors. Therefore, motion vectors with high accuracy can be calculated easily.

The motion vector calculation method according to the present invention may further include dispersedly extracting multiple feature points of a reference image and calculating motion vectors between the reference image and a target image based on the extracted feature points.

The term, "dispersedly" here means that, when an image feature point is created at one position, it is avoided to create another image feature point in the vicinity thereof.

According to the present invention, since motion vectors are calculated by efficiently obtaining feature points, the accuracy of calculation can be maintained, and, at the same time, the load on a computer therefor can be reduced.

Further in the motion vector calculation method, the motion vectors between the reference image and the target image may be motion vector mesh data indicating respective movements of corresponding feature points, lines connecting the feature points and areas defined by the feature points or the lines. Preferably, the area of the motion vector mesh data may be divided into one or more polygons, especially into triangles, based on image feature points.

According to the present invention, the movement between images is managed not only by the correspondence between points but also by expressing the movement of a line and an area by motion vector mesh data. Thus, movement can be managed finely and with high accuracy in a smaller amount of data.

A hand-movement correction device according to the present invention is a hand-movement correction device that performs hand-movement correction by using the motion vector calculation method above, the device including a motion vector calculating unit for inputting multiple images, calculating motion vectors between a reference image and one or more target images by using the motion vector calculation method and outputting the calculation result, synthesis image generation means for generating a synthesis image by performing pre-processing for superposing the target images over the reference image using the motion vector calculated by the motion vector calculation unit and the target images, image synthesis means for generating an image by superposing the one or more synthesis images generated by the synthesis image generation means over the reference image; and image data output means for outputting the image data generated by the image synthesis means.

Preferably, in the hand-movement correction device, the image synthesis means calculates the maximum range of a hand-movement and performs averaging processing based on the number of the synthesis images on the area from an image frame to the maximum range.

Since the frame part of an image is brought out of the range of shooting by a hand-movement, and the synthesized data becomes incomplete. Thus, the frame part becomes dark using simple superposition. The occurrence of the darkness of an image frame can be avoided by adjusting the intensity based on the number of superposed images.

An imaging device according to the present invention is an imaging device having the hand-movement correction device. The imaging device also includes an imaging unit for shooting a subject in series, generating multiple images and inputting them to the hand-movement correction device, and a storage unit for storing images in the hand-movement correction device.

A moving picture generation device according to the present invention is a moving picture generation device that generates a moving picture by using the motion vector calculation method. The moving picture generation device includes a motion vector calculation unit for inputting multiple images and calculating motion vectors between the reference image and one or more target images, motion vector editing means for calculating one or more sets of intermediate motion vectors by dividing the motion vectors calculated by the motion vector calculating unit by a predetermined value, and moving picture generation means for generating a middle image by applying the intermediate motion vectors to the reference image and enabling to display the initial image, middle images and final image in a time-series manner.

A program according to the present invention is a computer-executable program that inputs multiple pieces of image data and calculating motion vectors between the images. The program includes processing for calculating and storing multi-resolution data up to a predetermined resolution level L (where L is a natural number) of each of the input multiple pieces of image data, processing for calculating the input motion vectors for the resolution level L of the reference image and processing for estimating motion vectors per resolution by using the reference image, a target image and the input motion vectors of the resolution L, which are calculated by the processings above, to perform a step (1) of defining an energy function on each starting point coordinate of the input motion vectors by handling the coordinates on the reference image and a coordinate on the target image as arguments, and temporarily calculating motion vectors, within predetermined range from the input motion vectors, based on the energy function, a step (2) of temporarily calculating the reliability of the motion vectors based on a feature amount of an image at each feature point of the reference image, a step (3) of calculating the correlation by using at least one of a difference in the feature amount of the image and a difference in the calculated motion vectors between feature points of the reference image, and a step (4) of finally calculating motion vectors of the resolution level L by smoothing the temporarily calculated motion vectors and the reliability by using the motion vectors, the reliability and the correlation in predetermined ranges, wherein the motion vectors between the reference image and the target image are calculated by using the finally calculated motion vectors of the resolution level L as input motion vectors of a resolution level L-1, which is a higher resolution, and by repeating the processing for estimating motion vectors per resolution on image data having higher resolutions sequentially.

Advantages

According to the present invention, motion vectors are finally calculated by a matching step of temporarily calculating motion vectors having the defined reliability and correlation as parameters and a smoothing step of adjusting the temporarily defined motion vectors in consideration of motion vectors in a predetermined range and performing this from an image of a lower resolution to an image of a higher resolution sequentially. Because such the repetitive calculations are performed, motion vectors with high accuracy can be calculated without imposing a load on a computer therefor.

Motion vectors of points, lines or areas with high reliability are only calculated by identifying feature points by focusing on edges or corners of an image and calculating the motion vectors of the feature points. Thus, the amount of data can be reduced.

BRIEF DESCRIPTION OF THE DRAWINGS

FIG. 3 are explanatory diagrams of points, lines and areas of motion vector mesh data. FIG. 3(a) is a sample image, and FIG. 3(b) is an explanatory diagram of a correspondence relationship among points, lines and areas on the image.

FIG. 4 are data structure diagrams of motion vector mesh data. FIG. 4(a) shows a data structure example of motion vector points. FIG. 4(b) shows a data structure example of motion vector lines. FIG. 4(c) shows a data structure example of motion vector areas.

FIG. 6 are examples of multi-resolution image data.

FIG. 7 are explanatory diagrams of the way to specify motion vector mesh data A. FIG. 7(a) shows a reference image and a target image, and FIG. 7(b) shows a correspondence relationship of the data between the images.

FIG. 19 is a data structure diagram of the moving picture data file in FIG. 18.

Figure 1:
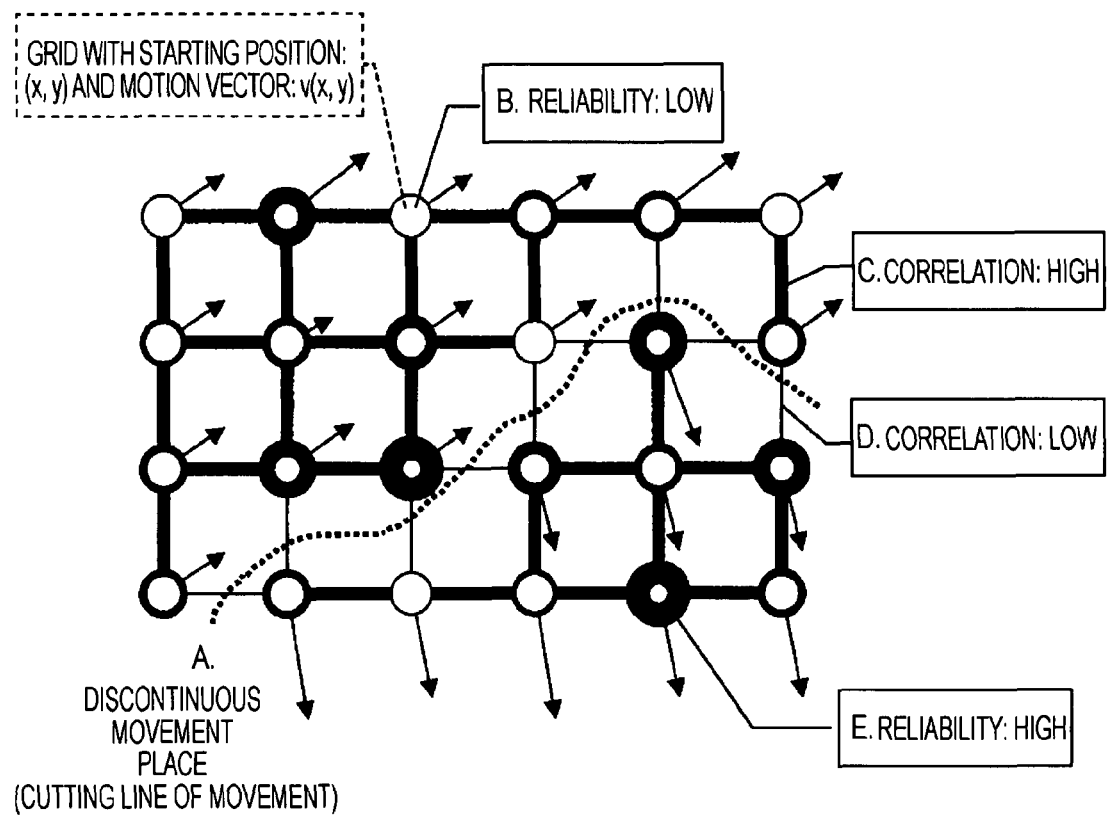
FIG. 1 is an explanatory diagram of motion vectors, reliability and correlation according to the present invention.

REFERENCE NUMERALS 1 motion vector calculation device
6 hand-movement correction device
7 imaging device
8 moving picture generation device
10 external storage device
11 input device
12 display device
13 motion vector calculation unit
15 motion vector data storage unit
31 image data input means
32 multi-resolution image generation means
33 mesh specification means
34 image feature point group extraction means
35 triangle division means
36 motion vector estimation means
37 motion vector output means
50 input image data file
51 multi-resolution image data file
52 motion vector mesh data A file
53 image feature point group data file
54 motion vector mesh data B file
55 motion vector mesh data C file
61 hand-movement correction data calculation unit
62 hand-movement correction data storage unit
63 image synthesis means
64 image editing means
65 image data output means
67 synthesized image data file
68 output image data file
71 imaging means
72 removable memory
73 external interface means
81 moving picture data calculation unit
83 intermediate data generation means
84 moving picture data generation means
85 moving picture data output means 87 intermediate data file
88 moving picture data file

BEST MODE FOR CARRYING OUT THE INVENTION

Embodiments of the present invention will be described below.

First Embodiment (Motion Vector Calculation Device and Motion Vector Calculation Method)

Figure 2:
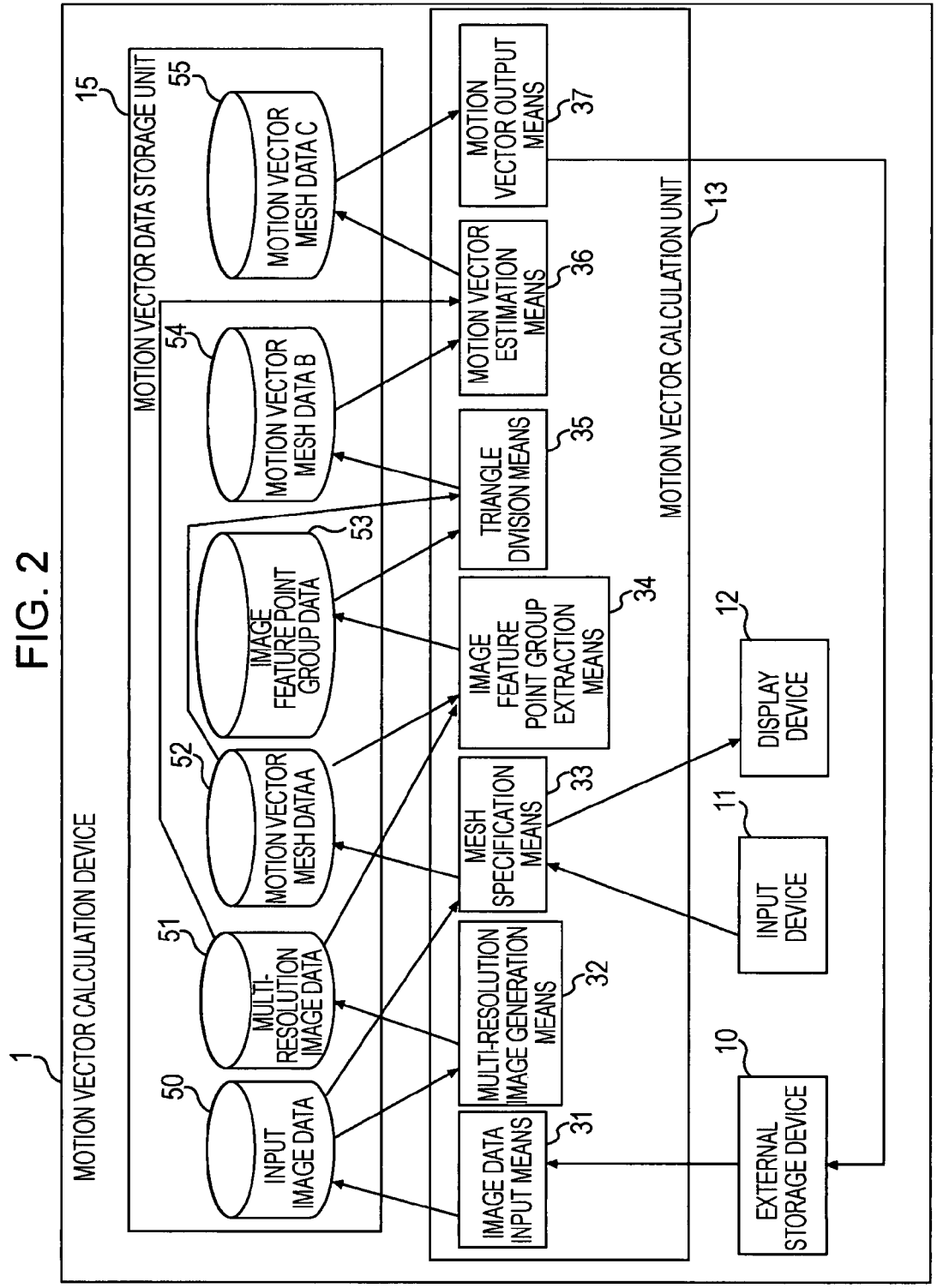
FIG. 2 is a block diagram of a motion vector calculation device according to a first embodiment of the present invention.

FIG. 2 is a block diagram of a motion vector calculation device according to this embodiment. The device receives the input of multiple images and calculates motion vectors among the images.

Here, a motion vector calculation device 1 includes an external storage device 10 such as a CD-ROM drive for reading/writing image data, an input device 11 including a keyboard and a mouse, for example, for inputting specification information by a user (or an operator), a display device 12 for displaying image data, a motion vector calculation unit 13 for calculating motion vectors based on input image data, and a storage unit 15 for storing input image data and/or motion vector data.

The motion vector calculation unit 13 includes image data input means (function) 31 for receiving the input of image data from the input device 11, the display device 12 or the external storage device 10 and storing them in the storage unit 15, multi-resolution image generation means (function) 32 for performing filtering processing on each input image data and thus generating image data with multiple resolution levels, mesh specification means (function) 33 for specifying a mesh of motion vectors based on an instruction from the input device 11, image feature point group extraction means (function) 34 for extracting one or more feature points of an image, triangle division means (function) 35 for dividing areas generated by connecting feature points of an image into triangles, motion vector estimation means (function) 36 for calculating motion vectors based on feature points that has been divided into triangles, and motion vector output means (function) 37 for outputting calculated motion vector data. The means 31 to 37 are processed and executed as functions of a CPU.

Here, the data to be stored in the storage unit 15 will be described. Image data is data having w×h grids where the width is w and the height is h and having a pixel value (such as RGB and YCbCr) at each of the grids.

Image feature point group data is a group of feature point data of image data, and each image feature point includes the coordinate (x,y).

Motion vector mesh data is data of motion vectors of an image. Motion vector mesh data includes multiple motion vector points, motion vector lines and motion vector areas. For example, motion vector mesh data may be defined as shown in FIG. 3(b) for the image in FIG. 3(a).

A motion vector point consists of a coordinate (x,y) on an image, which is a starting point of a motion vector, the motion vector (dx,dy) and a determined flag fp. The determined flag is a flag indicating whether the motion vector of the point has been determined or not. A data example of motion vector points is shown in FIG. 4(a). Coordinates, motion vectors and determined flags are stored in association with motion vector point identification information (ID).

As illustrated in FIG. 4(b), a motion vector line consists of pointers [p1,p2] to two motion vector points, which are end points, and a determined flag fe. The determined flag is a flag indicating whether a motion vector on the line has been determined or not.

As illustrated in FIG. 4(c), a motion vector area consists of pointers [e1, e2, . . . , en] (where the number of boundary lines is n) to motion vector lines functioning as the boundaries, pointers [p1, p2, . . . , pn] (where the number of apexes is n) to motion vector points functioning as vertices of the area or both. A motion vector area further includes a determined flag fr indicating whether a motion vector within the area has been determined or not. The area is a triangle, but it can be also implemented as an arbitrary polygon.

Next, a method for generating motion vectors by operating the device 1 (motion vector calculation method) will be described below.

(Image Data Input Processing)

First, image data input from the external storage device 10 is stored in an input image data file 50 of the storage unit 15 by the image data input means 31. Then, the input image undergoes filtering processing by the multi-resolution image generation means 32 to generate images of lower resolutions and they are stored in the multi-resolution image data file 51.

(Multi-Resolution Image Generation Processing)

Figure 5:
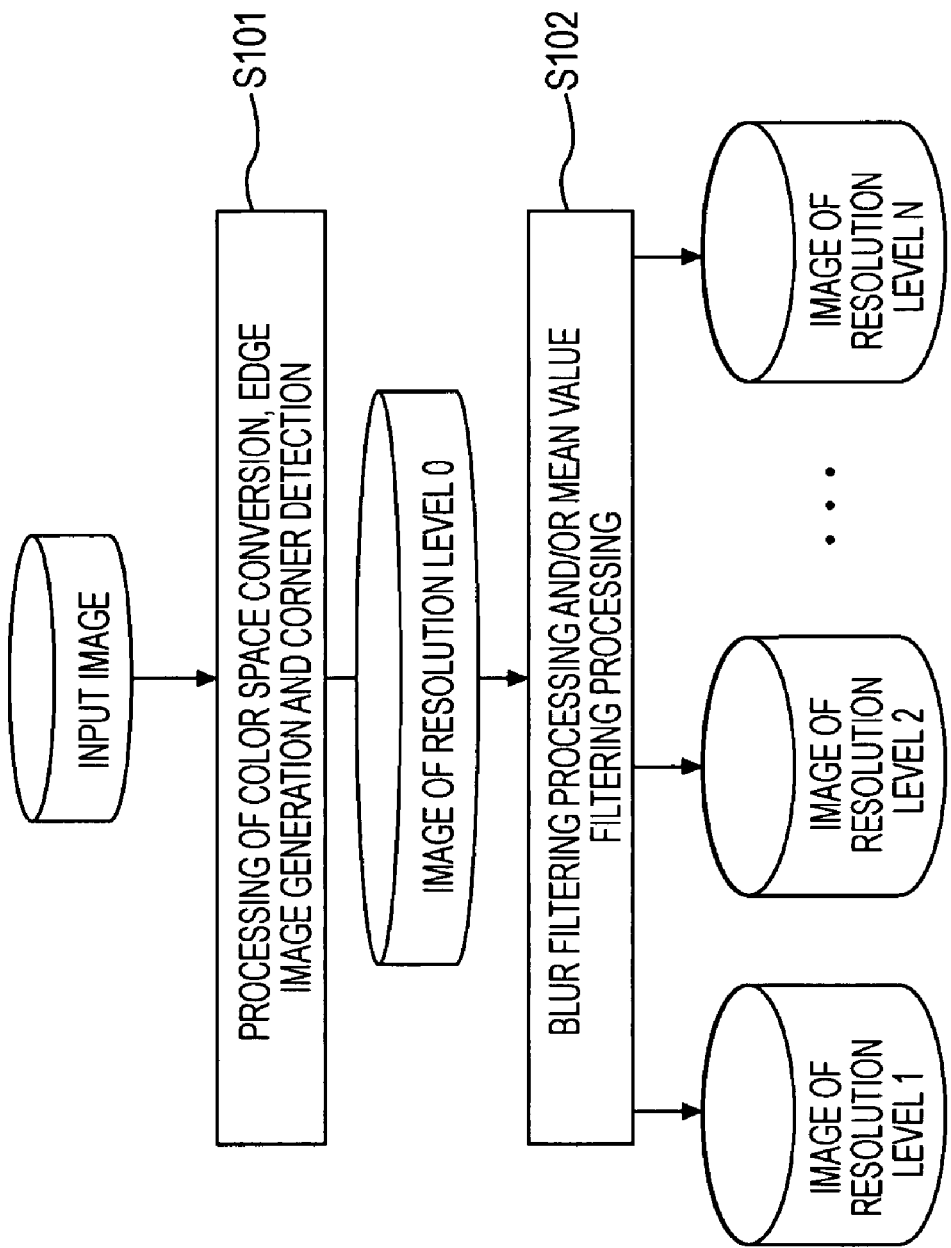
FIG. 5 is a flowchart showing processing steps by the multi-resolution image generation means in FIG. 2.

FIG. 5 is a flowchart showing processing steps by the multi-resolution image generation means 32. Color space conversion is performed on an input image, and processing for generating an edge image thereof, for example, is performed (S101) to generate images of the resolution level 0. Then, image data of lower resolutions is generated by applying a blur filter and/or averaging filter on each image data of the resolution level 0 (S102). The generated multi-resolution image data pieces are stored in the multi-resolution image data file 51.

FIG. 6 are examples of the multi-resolution image data. Here, the vertical row A shows images converted to Lab color space. Row B shows vertical edge images. Row C shows horizontal edge images. Row D shows direction-independent edge images. The horizontal direction indicates resolution levels with the application of a blur filter, and the resolution decreases as the resolution level value increases. These multi-resolution image data pieces are generated for each input image and are stored in the multi-resolution image data file 51 of the storage unit 15.

(Mesh Specification Processing)

On the other hand, a user executes the mesh specification means 33 and utilizes the input device 11 and display device 12 to extract a reference image, which functions as a reference in motion vector calculation, and a target image from the input image data file 50 and specify corresponding places of both images using points, lines or areas. In this case, multiple target images may exist. Alternatively, a grid may be defined with points only.

The mesh specification means 33 generates motion vector mesh data of the points, lines or areas in the forms as shown in FIG. 4 and stores them in the motion vector mesh data A file 52. Here, all of determined flags fp, fe and fr of motion vector points/lines/areas in the motion vector mesh data A are set.

In order to manually specify motion vectors from the image (reference image) on the left side in FIG. 7(a) to the image (target image) on the right side, for example, a user may operate to define a same mesh structure in the reference image and target image as shown in FIG. 7(b) and specify the motion vector mesh data A by moving the position of the mesh points to the corresponding positions of each of the images. The arrows in FIG. 7(b) are examples of the corresponding motion vector points.

(Image Feature Points Group Extraction Processing)

Next, the image feature point group extraction means 34 is executed through the input device 11 or by the completion of the operation by the mesh specification means 33, inputs multi-resolution image data and the motion vector mesh data A, and outputs image feature point group data.

Image feature points are generated at the center of edges or corners of an image. When an image feature point is generated at one position, the generation of another image feature point is prevented in the vicinity. This is because a motion vector at one position in an image may possibly have a substantially equal value as that of a motion vector in the vicinity. Image feature points are distributed in this way such that entire motion vectors can be approximate with feature points as few as possible.

No image feature points are generated on and in the vicinity of motion vector points/lines/areas in the motion vector mesh data A. This is because they are not required to automatically calculate since a user clearly specified the motion vectors.

Figure 8:
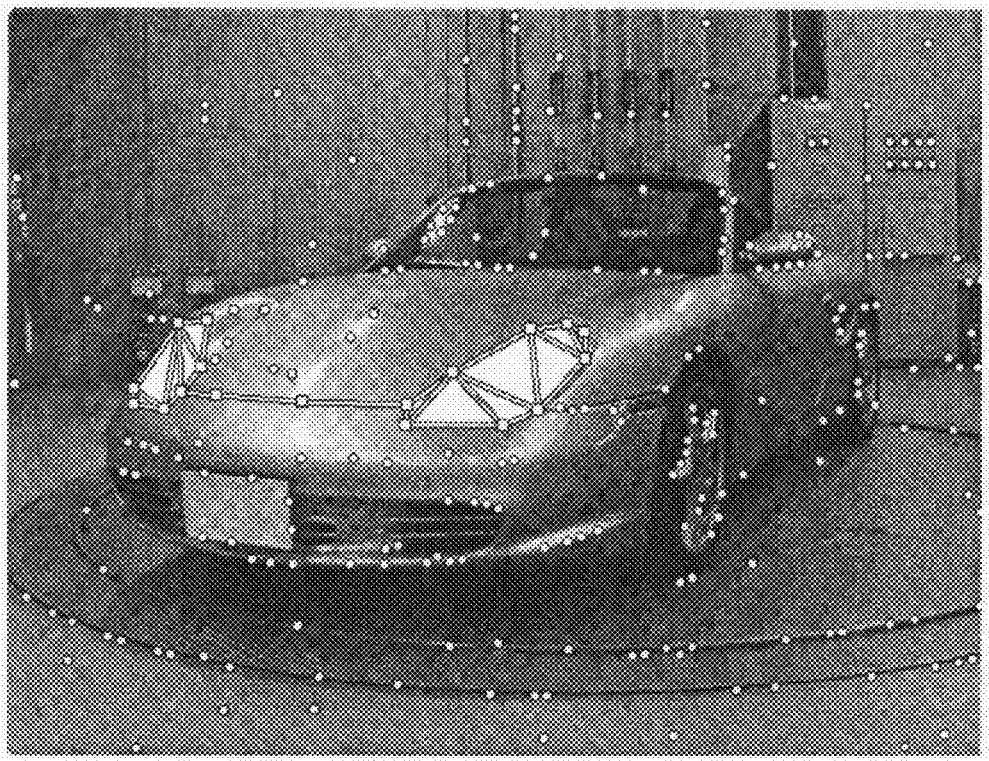
FIG. 8 is an explanatory diagram of an image feature point group.

For example, the image feature point group for the motion vector mesh data A in FIG. 3(b) or 7(b) is as indicated by circle points in FIG. 8. Even when feature points are detected on the motion vector mesh and the vicinity, the points are not stored as feature points.

(Triangle Division Processing)

Next, the triangle division means 35 receives the input of the image feature point group data 53 and the motion vector mesh data A, outputs motion vector mesh data B by dividing the area spanned by the feature points into triangles, and stores it in the motion vector mesh data B file 54.

The triangle division is performed by holding data of the motion vector points/lines/areas in the motion vector mesh data A and adding an image feature point group thereto. Constrained Delaunay triangle division is an example of the triangle division.

Figure 9:
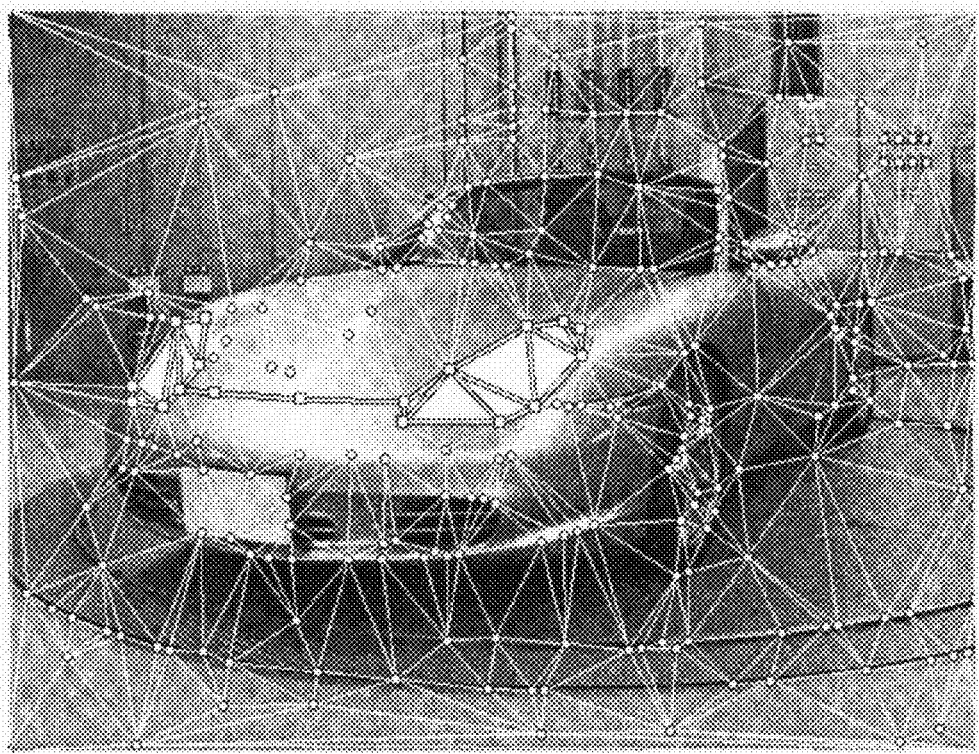
FIG. 9 is an explanatory diagram of a motion vector mesh data B, which is output of the triangle division means in FIG. 2.

For the motion vector mesh data B to be output, the triangle division means 35 sets a determined flag fp of a motion vector point if the motion vector point also originally exists in the motion vector mesh data A. On the other hand, the triangle division means 35 does not set fp for the motion vectors that are automatically added by the image feature point group extraction means 34. In the same manner, the determined flags fe and fr for the motion vectors lines/areas are set for those included in the motion vector mesh data A but are not set for those automatically generated by the triangle division means 35. For example, the motion vector mesh data B as a result of the triangle division on the motion vector mesh data A and image feature point group in FIG. 8 is as shown in FIG. 9. Here, the square points and thick lines correspond to the motion vector mesh data A, and determined flags are set since they are specified by a user. No determined flags are set for the other circle points and thin lines.

(Motion Vector Estimation Processing)

Next, the motion vector estimation means 36 receives the input of the multi-resolution image data 51 and the motion vector mesh data B, outputs motion vector mesh data C with determined flags for all of motion vector points/lines/areas set by automatically calculating the motion vectors of the motion vector points with the determined flag fp not set, and stores it in the motion vector mesh data C file 55.

Various techniques are possible for the automatic calculation of motion vectors. For example, motion vectors may be calculated in pixels or in dense grids based thereon, and the result may be assigned to motion vector points. Alternatively, motion vectors on the vertices may be only calculated. Further alternatively, the hybrid technology thereof may be adopted. In either case, motion vectors on motion vector points/lines/areas with determined flags set do not have to be calculated, and motion vectors on the other points are calculated to be consistent with determined motion vectors, are calculated.

These techniques allow both of the increase in speed of the calculation and the generation of motion vector mesh data intended by a user. In the example of the motion vector mesh data B in FIG. 9, motion vectors of the square points and thick line parts are already given by a user, and not required calculations since determined flags thereof are set already. The circle points and thin line parts are only to be automatically calculated. The automatic calculation is performed in consideration of the consistency with the motion vectors of the square points and thick line parts and without any change in the motion vectors of the square points and thick line parts by the processing method below.

Figure 10:
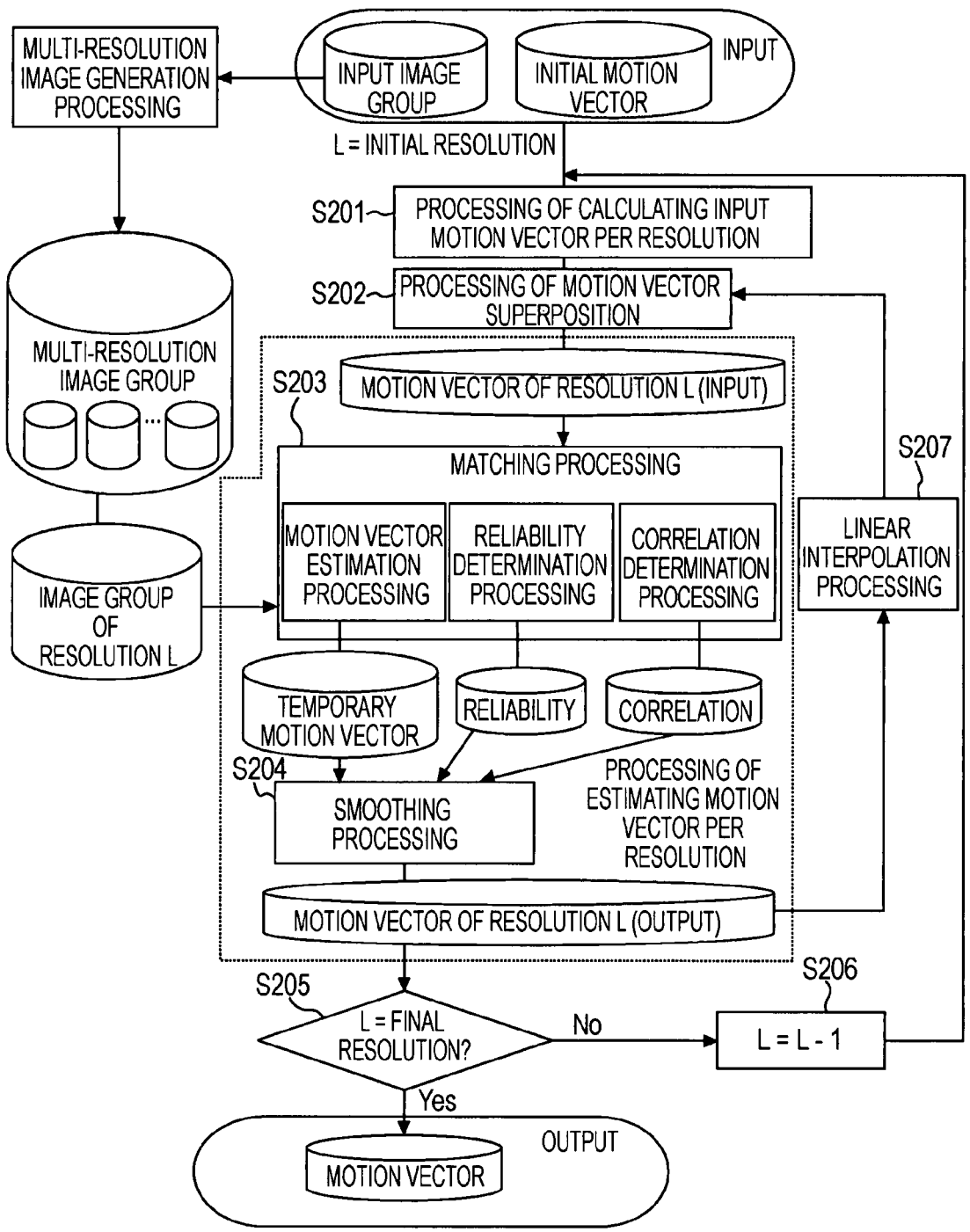
FIG. 10 is a flowchart showing processing steps of the motion vector estimation means in FIG. 2.

Referring to FIG. 10, the processing by the motion vector estimation means 36 will be described in detail next. First of all, motion vectors stored in the motion vector mesh data B file 54 are handled as initial motion vectors, and resolution correction processing is performed thereon (S201). The resolution correction processing down-samples motion vectors in accordance with a given resolution, and grid-type motion vectors of the resolution level L have one element ((x,y),v(x, y)) for every 2^L pixels as movement information.

The down-sampling processing is described more detail below. Motion vectors (including mesh data), which are motion vectors of points not on a grid of the resolution level L and with their determined flags set, are assigned to motion vectors on neighboring grid points on the grid of the resolution level L under a predetermined movement rule. When motion vectors moved from multiple points exist on one grid point, the average value of the motion vectors is set as the motion vector of the grid point.

Here, motion vectors with their determined flags not set may be processed as (0,0) in a case of two-dimensional space, for example.

Next, motion vector superposition processing is performed (S202). All motion vectors, which are (0,0), are superposed over the motion vector data of the resolution level L (initial resolution) generated by step S201 in the first loop. As a result, the motion vector data of the resolution level L (initial resolution) is directly the output of this step.

Superposition processing of the motion vector data of resolutions other than the initial resolution will be described later.

Matching processing is performed with the motion vectors of the resolution level L obtained through the correction in that way (S203).

Figure 11:
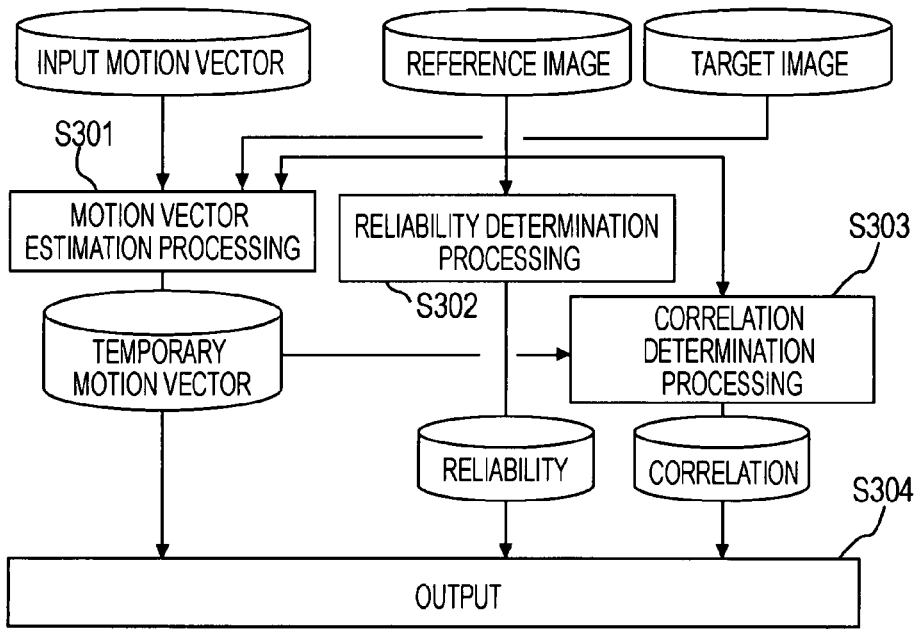
FIG. 11 is a flowchart showing the matching processing steps in FIG. 10 (for two images).
Figure 12:
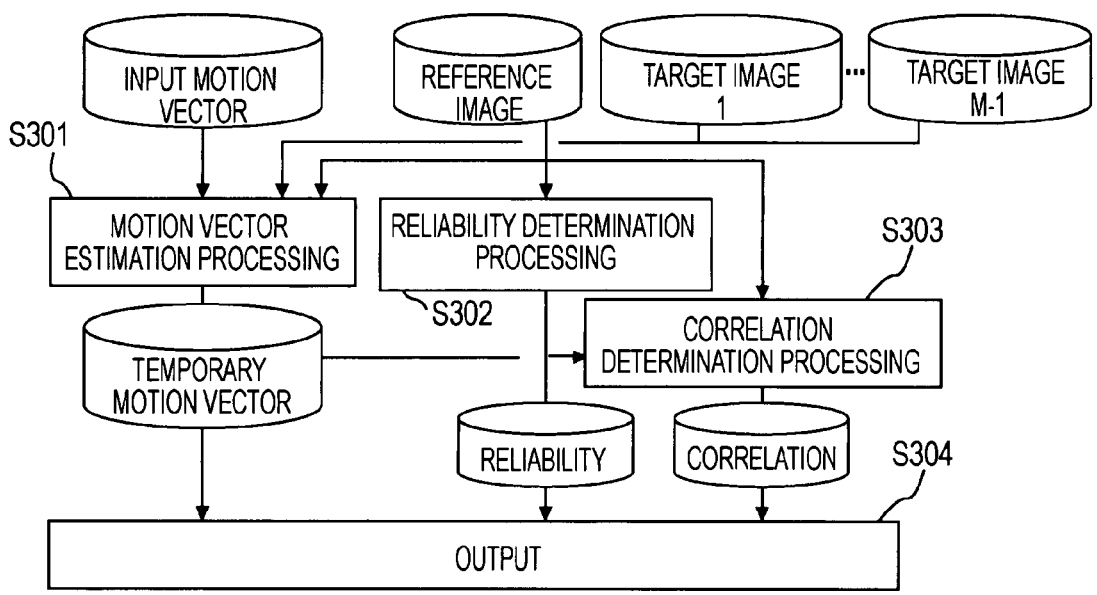
FIG. 12 is a flowchart showing the matching processing steps in FIG. 10 (for multiple images).

Referring to FIGS. 11 and 12, the matching processing will be described below.

FIG. 11 is an explanatory diagram of matching processing steps for two images.

In the matching processing, the reference image of the resolution level L obtained by the processing above, a target image and input motion vectors are used to define an energy function of each starting coordinate of the input motion vectors by handling the coordinates on the reference image and the coordinates on the target image as arguments, and the motion vectors temporarily calculated based on the energy function in a predetermined range of the input motion vectors (S301). The reliability is further temporarily calculated by using information such as an edges and a corner of each feature point of the reference image (S302). Alternatively, the reliability may be the energy function above instead of a function based on the image such as the strength of an edge thereof. How to define the reliability depends on which condition has the highest priority upon executions. For example, in the application that matching is performed with the emphasis on those at the center of a screen, smoothing processing may be performed with the reliability that is calculated by the Gaussian function where the center of a screen is 1.

Next, the correlation is calculated based on a color difference between feature points of the reference image and a difference between the temporarily calculated motion vectors (S303).

The correlation may be obtained by multiplying the square of the difference in color of pixels and the square of the magnitude of the difference in motion vector and converting it to 1 to 0 by the Gaussian or equivalent function.

Generally, applying the technique of defining the correlation using a difference in color between adjacent pixels and/or information on the image only, a part moving in a same manner but having a different feature tends to be discontinuous. However, adding information on motion vectors can prevent the problem. On the other hand, expressing the correlation only with motion vectors may cause discontinuities at the mismatched parts. In order to prevent this, both of image information and information on motion vectors may be used.

Next, the data on the temporarily calculated motion vectors, reliability and correlation are output (S304).

Although having described the case for two images, it should be noted that the data on motion vectors, reliability and correlation may be calculated for the reference image and each of multiple target images as shown in FIG. 12. In this case, there are a case that a movement of each target image is calculated about one reference image or a case that each target image functions as a reference image to the next target image, for example.

So-called block matching may be used as an example of the energy function.

Referring back to FIG. 10, smoothing processing is performed after the matching processing in step S203, and motion vectors of the resolution level L are finally calculated (S204).

Figure 13:
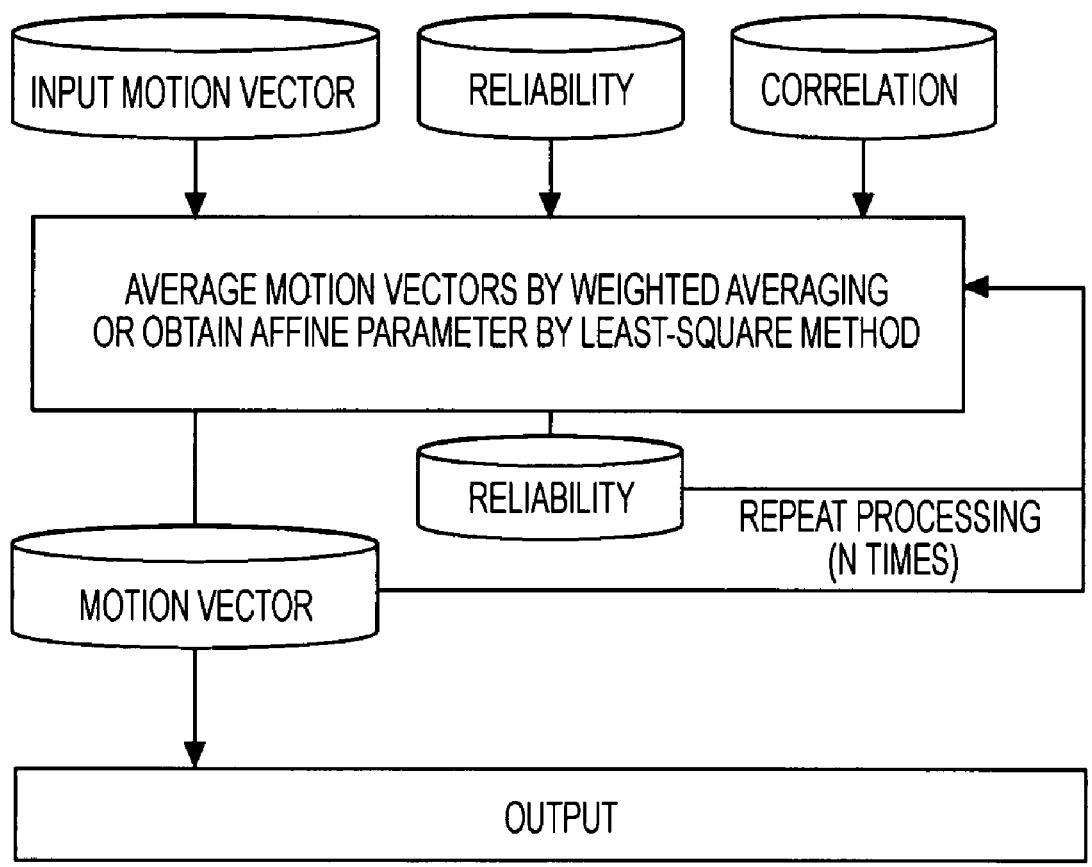
FIG. 13 is a flowchart showing the smoothing processing steps in FIG. 10.

The steps of the smoothing processing are shown in FIG. 13. In the figure, motion vectors of the resolution level L are calculated by averaging (smoothing) the motion vectors and reliability, which are temporarily calculated by the matching processing, by weighted averaging processing by using motion vectors, reliability and correlation of the surroundings.

The equation of the smoothing by weighted averaging is as follows:

$$v_{i+1}(x_1, y_1) = \frac{\sum_{\text{surroundings of } (x_2,y_2) \in (x_1,y_1)} a_i(x_1, y_1, x_2, y_2) r_i(x_2, y_2) v_i(x_2, y_2)}{\sum_{\text{surroundings of } (x_2,y_2) \in (x_1,y_1)} a_i(x_1, y_1, x_2, y_2) r_i(x_2, y_2)} \quad [\text{EQ1}]$$

$$r_{i+1}(x_1, y_1) = \frac{\sum_{\text{surroundings of } (x_2,y_2) \in (x_1,y_1)} a_i(x_1, y_1, x_2, y_2) r_i(x_2, y_2)}{\sum_{\text{surroundings of } (x_2,y_2) \in (x_1,y_1)} a_i(x_1, y_1, x_2, y_2)} \quad [\text{EQ2}]$$

where i is the number of times that the smoothing is repeated.

As described above, each of the motion vectors is the weighted average by the product of the reliability and the correlation, and the reliability is the weighted average by the correlation.

Alternatively, an affine parameter may be calculated by the least squares method instead of the weighted averaging processing.

The equation of the smoothing in this case is as follows:

$$v_{i+1}(x_1, y_1) = (X_{i+1}^{-1} V_{i+1})^T \begin{pmatrix} x_1 \\ y_1 \end{pmatrix} - \begin{pmatrix} x_1 \\ y_1 \end{pmatrix} \quad [EQ3]$$

where $$X_{i+1}(x_1, y_1) = \sum_{surroundings\ of\ (x_2,y_2)\in(x_1,y_1)} a_i(x_1, y_1, x_2, y_2) \quad [EQ4]$$

$$r_i(x_2, y_2) \begin{pmatrix} x_2 x_2 & x_2 y_2 & x_2 \\ x_2 y_2 & y_2 y_2 & y_2 \\ x_2 & y_2 & 1 \end{pmatrix}$$

$$V_{i+1}(x_1, y_1) = \quad [EQ5]$$

$$\sum_{surroundings\ of\ (x_2,y_2)\in(x_1,y_1)} a_i(x_1, y_1, x_2, y_2) r_i(x_2, y_2) \begin{pmatrix} u_2 x_2 & v_2 x_2 \\ u_2 y_2 & v_2 y_2 \\ u_2 & v_2 \end{pmatrix};$$

and $$(u_2, v_2) = (x_2, y_2) + v_i(x_2, y_2) \quad [EQ6]$$

Here, r(x1,y1) is the same as that of the weighted averaging case.

When the smoothing processing completes, it is determined whether the resolution is the final resolution (where the resolution level is 0 normally) or not (S205). If not, at the resolution level L=L-1 (S206), in other words, at one higher resolution level, the processing at and after step S201 is repeated on the image data of the resolution.

The motion vectors of the resolution level L resulting from the smoothing processing are used to generate the motion vector data of the resolution level L-1 by linear interpolation processing (S207).

Describing the linear interpolation processing in more detail, grid points are plotted among the motion vectors on the grid points of the resolution L, and the motion vectors on the added grid points are calculated by averaging the motion vectors on the grid points of the vicinity at the resolution level L.

For example, the motion vectors of the resolution 2 are calculated as:

v(32,32)=v(32,32)

v(32,36)=½v(32,32)+½v(32,40)

v(36,36)=¼v(32,32)+¼v(32,40)+¼v(40,32)+¼v(40,40)

where the motion vectors of the resolution 3 are v(32,32)v(32,40)v(40,32)v(40,40).

Then, in the superposition processing in step S202, the interpolated motion vector data is superposed over the input motion vector data generated by step S201, which is handled as the input motion vectors in the matching processing.

The series of these processing steps is repeated until the final resolution is obtained (S205), and the motion vectors at the final resolution is stored in the motion vector mesh data C file 55.

(Motion Vector Output Processing)

The motion vector output means 37 outputs the motion vector data stored in the motion vector mesh data C file 55 to the external device 10 or another program module.

According to this embodiment, temporary motion vectors are calculated by using color information only, and the calculation is performed by using it and parameters of different concepts of the reliability based on edge information and/or corner information and the correlation based on a difference in motion vector. Thus, motion vectors with high accuracy can be calculated without imposing a load on a computer therefor. In particular, by defining the level of multi-resolution and/or the number of times that the smoothing processing is repeated, the calculation can be performed in accordance with the ability of the computer and/or the required precision of the motion vectors, which results in high general versatility and thus can be used for various applications such as hand-movement correction and moving picture generation.

Other Example 1 of Motion Vector Calculation Device

Figure 14:
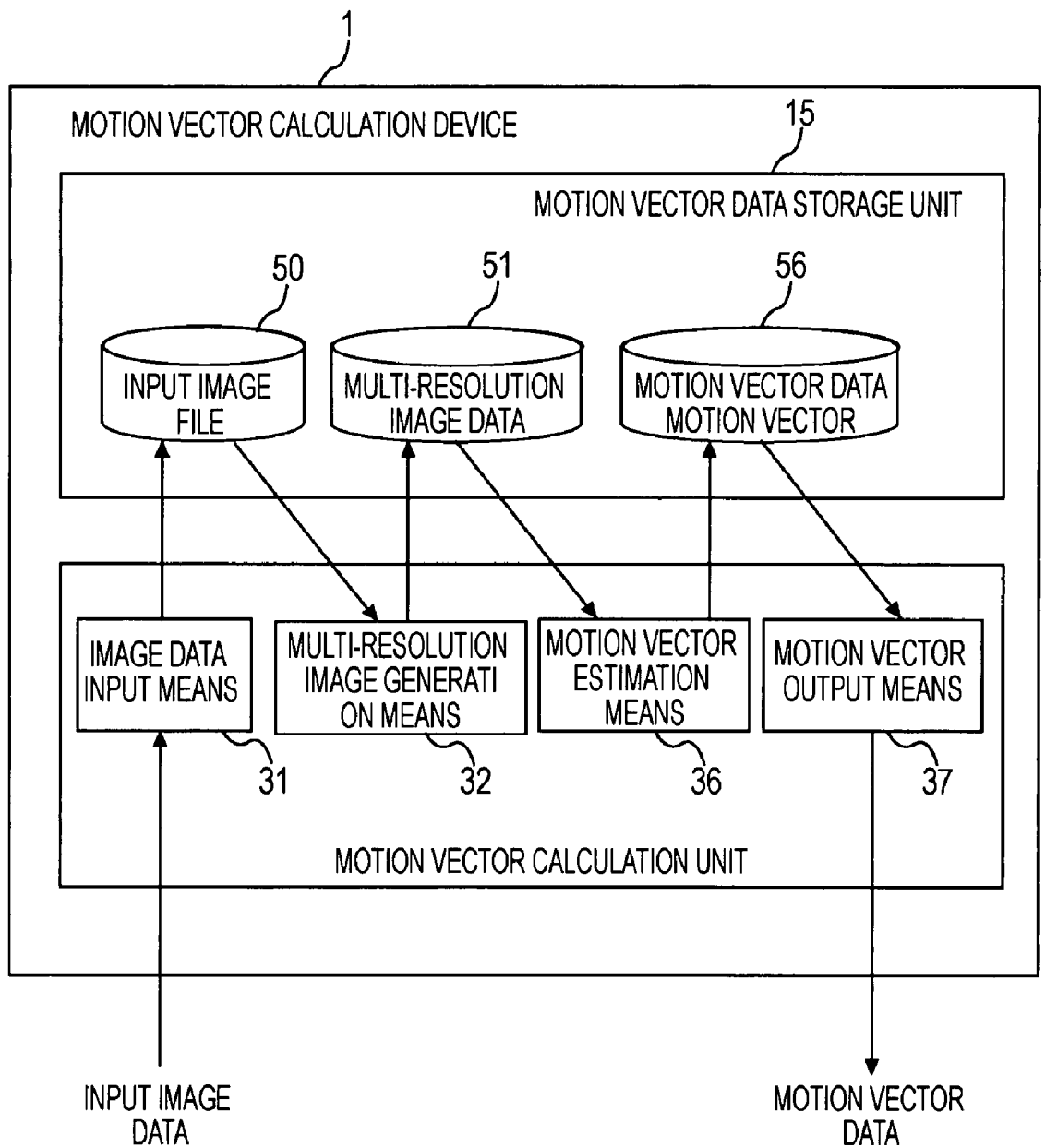
FIG. 14 is a block diagram of a motion vector calculation device according to Example 1 of the present invention.

The above-described motion vector calculation device 1 can be also implemented by the construction shown in FIG. 14. That is, image data with multi-resolution is generated by the multi-resolution image generation means 32, which has received image data input by the image data input means 31, and grid type motion vectors are calculated by the processing above by using it by the motion vector estimation means 36.

In this case, the motion vector estimation means 36 does not need to control the determined flag shown in FIG. 4 since the multi-resolution image data 51 is only used.

Other Example 2 of Motion Vector Calculation Device

The presence of the functions of mesh specification means 33, image feature point group extraction means 34 and triangle division means 35 in FIG. 2 can be enabled or disabled in accordance with the load on a calculation therefor and/or the application.

Figure 15:
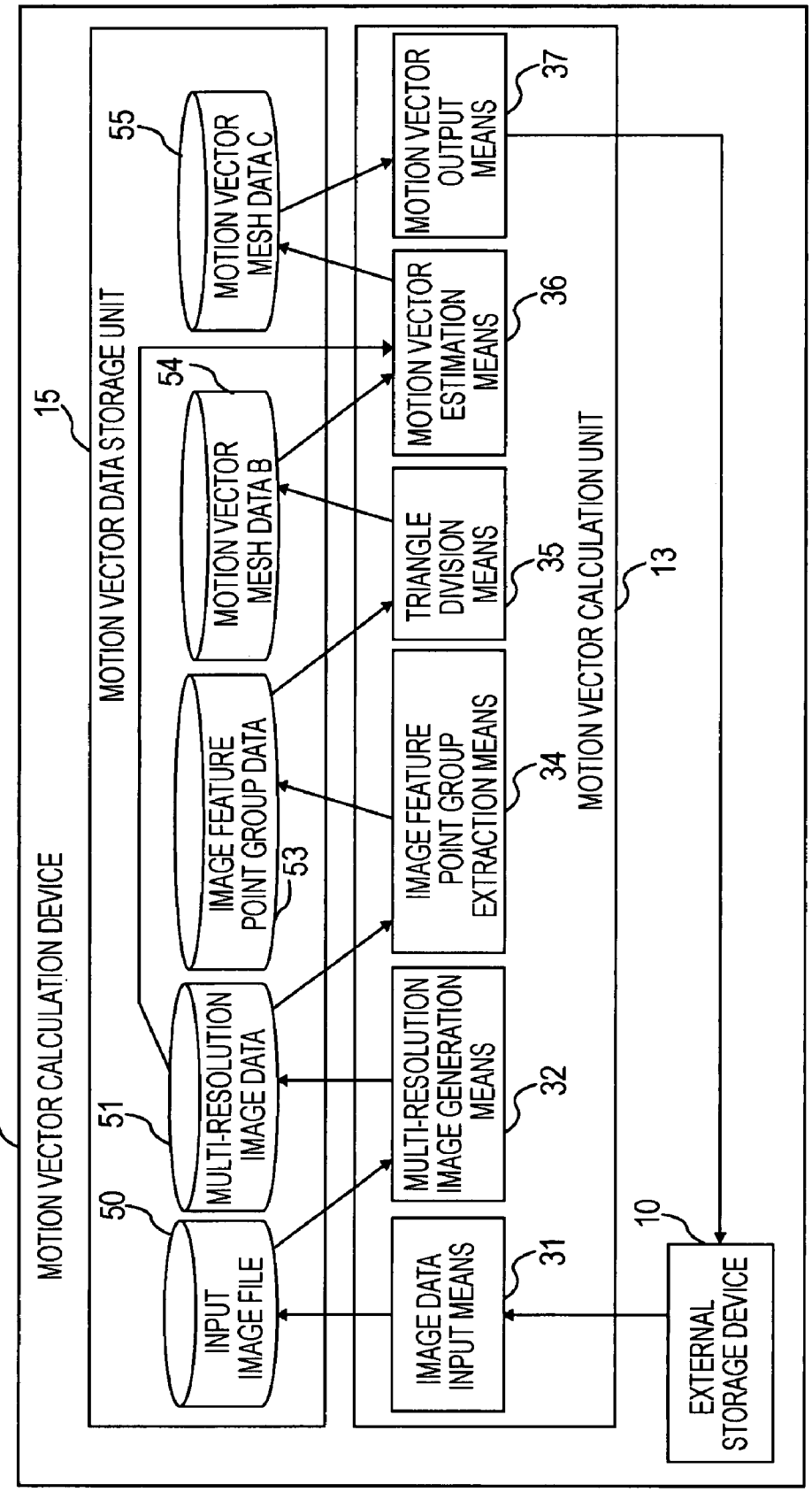
FIG. 15 is a block diagram of a motion vector calculation device according to Example 2 of the present invention.

For example, the mesh specification means 33 may be omitted as shown in FIG. 15 if a user does not require inputting the correspondence relationships of images in advance. In this case, the image feature point group extraction means 34 extracts feature points from an edge image of the resolution level 0 as multi-resolution image data and generates the image feature point group data. Then, based on it, the triangle division means 35 generates motion vector mesh data B. Then, the motion vector estimation means 36 uses the motion vector mesh data B to calculate the motion vectors.

Alternatively, the image feature point group extraction means 34 may use image data with a low resolution of multi-resolution image data to perform feature point extraction processing. When extremely many feature points are extracted from an input image (of the resolution level 0), it is possible to extract points with a large feature amount only by extracting feature points with a lower resolution. Thus, the load to be imposed on a computer therefor can be more reduced than the case that many feature points of image data with a high resolution are selected by comparing the feature amounts thereof.

While the motion vector calculation device 1 may be used for an application for inputting multiple images, outputting motion vectors corresponding to the reference images, managing image data with the motion vectors and compressing image data having a series of movements. The main part of the motion vector calculation unit 13 and motion vector data storage unit 15 of the device 1 may be used to implement the device according to the embodiment below.

Other Example 3 of Motion Vector Calculation Device

In another example of the motion vector calculation device 1, the function of the mesh specification means 33 may be used to provide means for defining a search range. In other words, while the mesh specification means 33 specifies corresponding points of a reference image and a target image, calculates a motion vector therebetween and sets a determined flag. However, in this case, the means does not set the determined flag, but only calculates motion vector data and stores it. Then, the motion vector estimation means 36 searches the area in a predetermined range of the stored motion vectors and calculates the motion vectors of points, lines or areas of the reference image and target image. Thus, the correspondence relationship in a wide range can be properly extracted, and schematic corresponding points may be only required to be specified when a user defines the search range. Therefore, the elimination of the necessity of strict specification can improve the operability.

Second Embodiment (Hand-Movement Correction Device)

Figure 16:
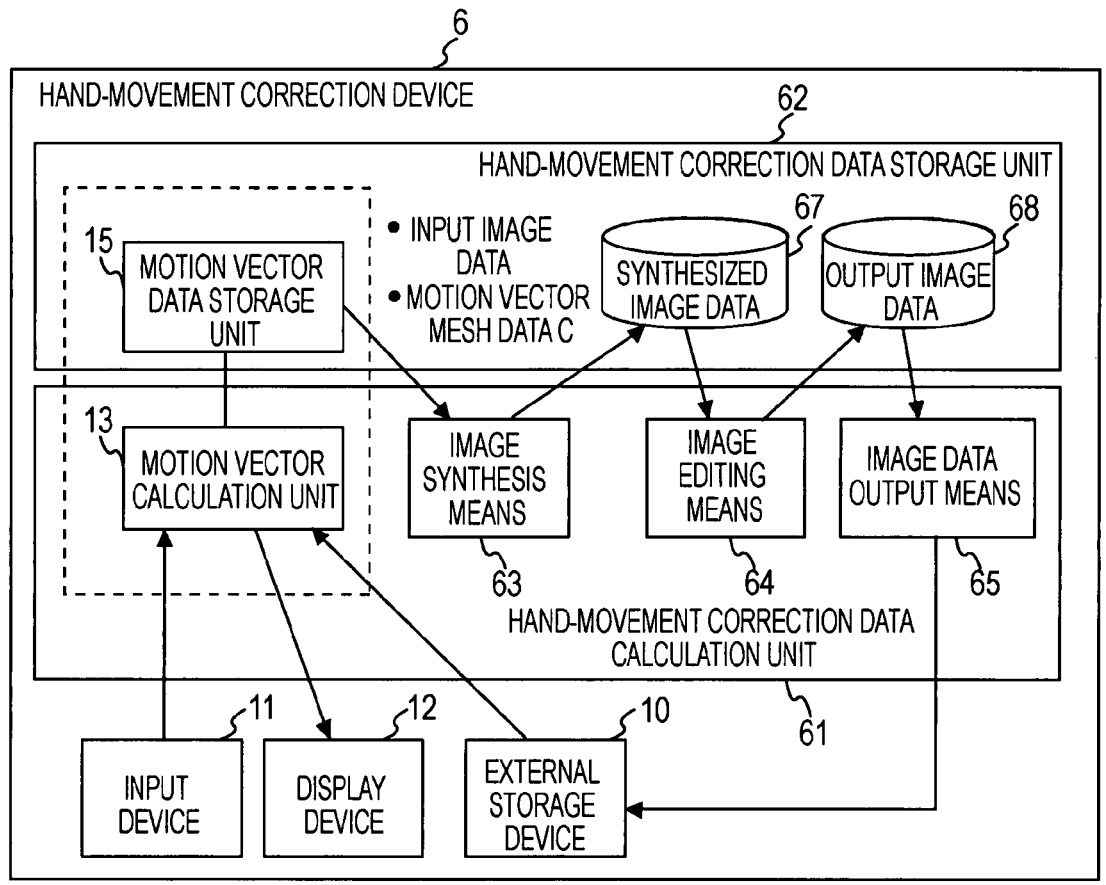
FIG. 16 is a block diagram of a hand-movement correction device according to a second embodiment of the present invention.

A hand-movement blur in shooting with a camera can be corrected by using the above-described motion vector calculation method. FIG. 16 is a block diagram of a hand-movement correction device according to this embodiment.

In this figure, a hand-movement correction device 6 includes a motion vector calculation unit 13, a motion vector data storage unit 15, image synthesis means (function) 63 for generating synthesized image data by superposing images by using multiple images and motion vectors thereof, image editing means (function) 64 for editing synthesized image data, and image data output means (function) 65 for outputting generated image data.

In this construction, multiple photograph images by rapid shooting are input through image data input means 31 of the motion vector calculation unit 13. Then, motion vector mesh data C from a reference image to target images is calculated. Normally, the first image of the rapid shooting is defined as the reference image. Then, the data is stored in the motion vector data storage unit 15.

Next, the image synthesis means 63 of the hand-movement correction device 6 receives the input image data and motion vector mesh data C stored in the motion vector data storage unit 15. Then, conversion processing is performed for fitting the target image to the reference image by using the motion vector data.

Generally, since motion vectors in a case with a hand-movement correction have the same direction and magnitude at all points, the means such as the mesh specification means 33 and triangle division means 35 may be eliminated, which can simplify the functions.

According to this embodiment, a reference image is selected from two or more images, and the other images are deformed and synthesized by using mesh-structured motion vectors from the images to the reference image. Thus, a clear image can be generated by removing CCD noises of a camera therefor.

Alternatively, moving subjects may be deleted by performing weighted averaging processing in synthesizing multiple images, and the background part can be thus extracted.

A natural synthesized image even at the areas near the frame of the image can be generated since the number of superposed images is stored for each pixel and weighted averaging processing is performed in accordance with the number of superposed images in image synthesis processing.

Third Embodiment (Camera With Hand-Movement Correction Device)

Figure 17:
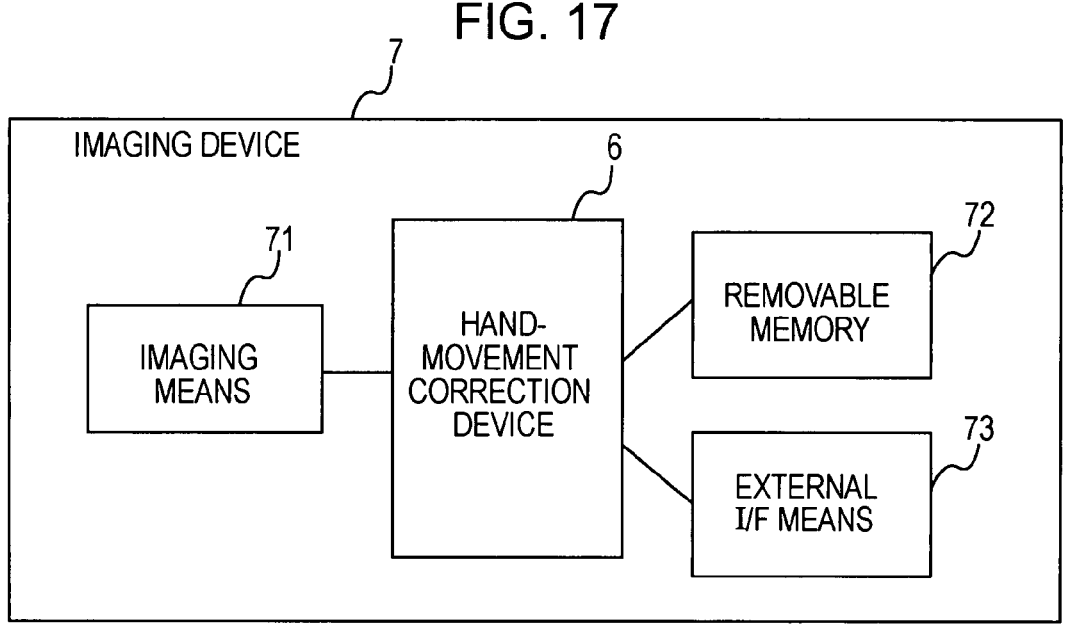
FIG. 17 is a block diagram of an imaging device according to a third embodiment of the present invention.

FIG. 17 is a block diagram of an imaging device such as a camera including the hand-movement correction device 6. A hand-movement correction device built in a camera is also highly practical for the motion vector calculation illustrated in FIG. 14 as a simplified function.

According to this embodiment, high quality image data can be obtained by implementing the hand-movement correction function on a microprocessor or an IC having calculation functions and building it onto an imaging device.

Fourth Embodiment (Moving Picture Generation Device)

The motion vector calculation method above can be used to efficiently generate a moving picture having smooth movements from multiple still images.

Figure 18:
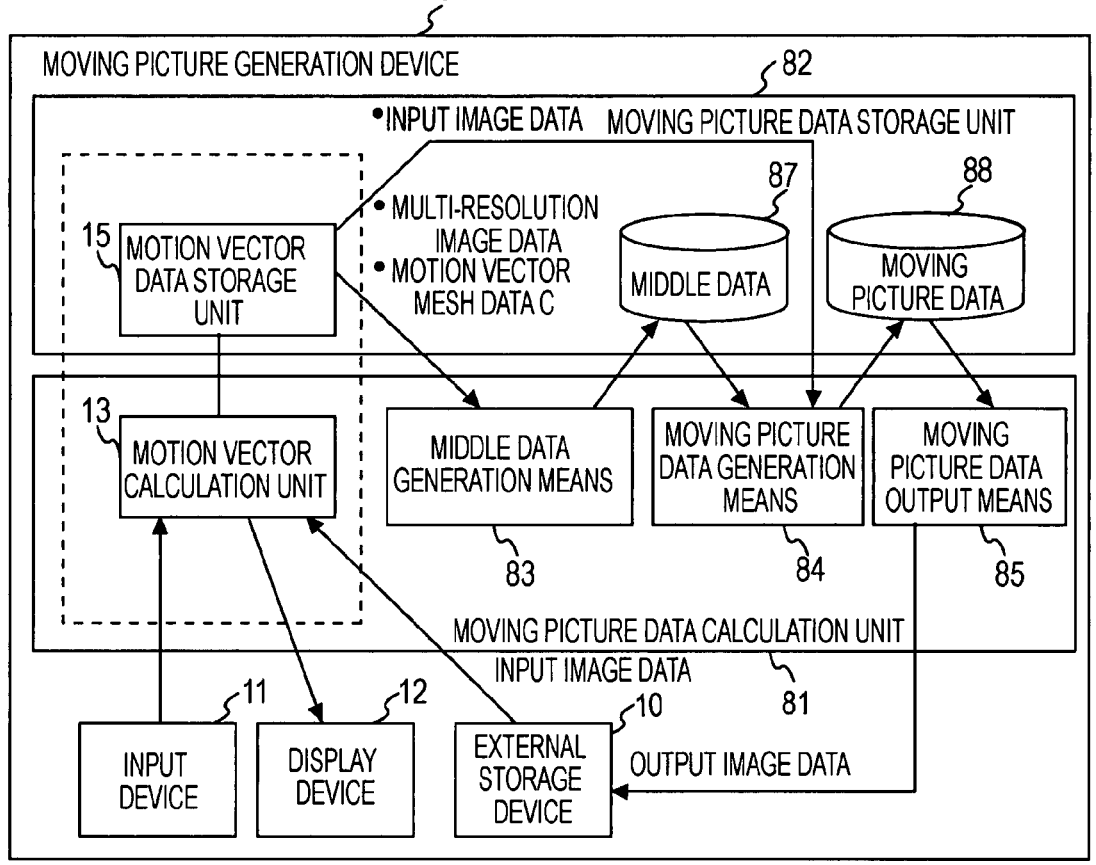
FIG. 18 is a block diagram of a moving image generation device according to the present invention.

FIG. 18 is a block diagram of a moving picture generation device according to this embodiment. In the figure, a moving picture generation device 8 includes the motion vector calculation unit 13, the motion vector data storage unit 15, intermediate data generation means (function) 83 for estimating a change in time between a reference image (initial image) and a target image (final image) and calculating the intermediate motion vectors, moving picture data generation means (function) 84 for generating moving picture data from the intermediate motion vectors and input images, and moving picture data output means (function) 85 for outputting generated moving picture data.

Here, the intermediate data generation means 83 calculates the speed and acceleration of a change of feature points of an image or mesh-structured motion vectors, obtains motion vectors for each predetermined time section and stores it in an intermediate data file 87.

Then, the moving picture data generation means 84 aligns input image data and the intermediate motion vectors in a time-series manner and stores them in a moving picture data file 88. FIG. 19 is a data structure example of the moving picture data file. Input images and motion vectors between them can be extracted in a time-series manner.

According to this embodiment, motion vectors for moving picture data can be generated without imposing a load on a computer therefor. Furthermore, smooth moving picture data can be generated from still picture data and synthesized pictures filling therebetween.

The present invention is not limited to the embodiments above, but various changes may be made without departing from the spirit and scope thereof. For example, image data and/or motion vectors may be exchanged with a computer machine over a communication network instead of inputting image data and/or outputting of motion vectors through an external storage device.

In addition to the application to the above-described device, the motion vector calculation method according to the present invention is also applicable to matching processing for Image-based VR (virtual reality) if images are aligned in order and if an object in the images moves under a certain rule.

The motion vector calculation method according to the invention is applicable to a hand-movement correction device that processes a blurred image by a hand-movement on a computer, an imaging device such as a digital camera and a video camera including a hand-movement correction function, a moving picture generation device that generates moving picture data with a smaller amount of data and high accuracy by using motion vector data, and so on.

The invention claimed is:

1. A motion vector calculation method in which multiple pieces of image data are input to calculate motion vectors between/among images, the method comprising:
   multi-resolution image generation processing for calculating and storing multi-resolution data up to a predetermined resolution level L (where L is a natural number) of the input multiple pieces of image data;
   input motion vector calculation processing for calculating input motion vectors for the resolution level L of a reference image; and
   processing for estimating motion vectors per resolution by using the reference image, a target image and the input motion vectors at the resolution level L calculated by the processings above to perform:
      a step (1) of defining an energy function on each starting point coordinate of the input motion vectors by handling a coordinate on the reference image and a coordinate on the target image as arguments, and temporarily calculating motion vectors, within predetermined range from the input motion vectors, based on the energy function;
      a step (2) of temporarily calculating reliability of the motion vectors based on an amount of strength of an edge or a corner angle detected from a color space of the reference image;
      a step (3) of calculating correlation by using a color difference between feature points of the reference image and a difference between the motion vectors temporarily calculated in the step (1); and
      a step (4) of finally calculating motion vectors of the resolution level L by smoothing each of the motion vectors temporarily calculated in the step (1) by weighted averaging by the product of the reliability and the correlation where the smoothing utilizes the reliability temporarily calculated in the step (2) smoothed by weighted averaging by the correlation,
   wherein the motion vectors between the reference image and the target image are calculated by using the finally calculated motion vectors of the resolution level L as input motion vectors of a resolution level L-1, which is a higher resolution, and by repeating the processing for estimating motion vectors per resolution on image data having higher resolutions sequentially.

2. The motion vector calculation method according to claim 1, further comprising processing for inputting specification information relating to the feature points of the reference image among the input images,
   wherein the input motion vector calculating processing calculates the input motion vectors relating to the feature points.

3. The motion vector calculation method according to claim 2, further comprising image feature point group extraction processing for dispersedly extracting multiple feature points of the reference image among the input images,
   wherein the input motion vector calculating processing calculates the input motion vectors relating to the feature points.

4. The motion vector calculation method according to claim 3, wherein the motion vectors are motion vector mesh data indicating respective movements of corresponding feature points, lines connecting the feature points and areas defined by the feature points or the lines between the reference image and the target image.

5. A motion vector calculation method in which multiple pieces of image data are input to calculate motion vectors between images, the method comprising:
   processing for inputting specification information relating to feature points of a reference image;
   processing for calculating motion vector mesh data representing correspondence relationships among points, lines and areas between the reference image and a target image based on input specification information;
   processing for dispersedly extracting multiple feature points of the reference image from an area excluding the area range of the input specification information and calculating, as motion vector mesh data, correspondence relationships among points, lines and areas between the reference image and the target image based on the extracted feature points;
   processing for dividing the area of the motion vector mesh data into one or more triangles, correcting the motion vector data to a predetermined resolution level L and calculating input motion vector mesh data;
   processing for calculating and storing multi-resolution data up to the resolution level L of the input multiple pieces of image data; and
   processing for estimating motion vectors per resolution by using the reference image, target image and input motion vector mesh data of the resolution level L, which are calculated by the processings above to perform:
      a step (1) of defining an energy function on each starting point coordinate of the input motion vector mesh data of an area excluding the area range of the input specification information by handling coordinates on the reference image and coordinates on the target image as arguments, and temporarily calculating the motion vector mesh data within predetermined range from the input motion vector mesh data based on the energy function;
      a step (2) of temporarily calculating reliability of the motion vector mesh data based on an amount of strength of an edge or a corner angle detected from a color space at each feature point of the reference image;
      a step (3) of calculating correlation by using a color difference between feature points of the reference image and a difference between the motion vector mesh data temporarily calculated in the step (1); and
      a step (4) of finally calculating motion vector mesh data of a the resolution level L by smoothing each of the motion vector mesh data temporarily calculated in the step (1) by weighted averaging by the product of the reliability and the correlation where the smoothing utilizes the reliability temporarily calculated in the step (2) smoothed by weighted averaging by the correlation,
   wherein the motion vector mesh data between the reference image and the target image are calculated by using the finally calculated motion vector mesh data of the resolution level L as input motion vector mesh data of a resolution level L-1, which is a higher resolution, and by repeating the processing for estimating motion vectors per resolution on image data having higher resolutions sequentially.

6. A computer program product comprising a tangible non-transitory computer readable medium storing a computer-executable program that inputs multiple pieces of image data and calculating motion vectors between the images, the program comprising:

processing for calculating and storing multi-resolution data up to a predetermined resolution level L (where L is a natural number) of each of the input multiple pieces of image data;

processing for calculating the input motion vectors for the resolution level L of the reference image; and processing for estimating motion vectors per resolution by using the reference image, a target image and the input motion vectors of the resolution level L, which are calculated by the processings above, to perform:

a step (1) of defining an energy function on each starting point coordinate of the input motion vectors by handling a coordinate on the reference image and a coordinate on the target image as arguments, and temporarily calculating motion vectors, within predetermined range from the input motion vectors, based on the energy function;

a step (2) of temporarily calculating reliability of the motion vectors based on an amount of strength of an edge or a corner angle detected from a color space of the reference image;

a step (3) of calculating correlation by using a color difference between feature points of the reference image and a difference between the motion vectors temporarily calculated in the step (1); and a step (4) of finally calculating motion vectors of the resolution level L by smoothing each of the motion vectors temporarily calculated in the step (1) by weighted averaging by the product of the reliability and the correlation where the smoothing utilizes the reliability temporarily calculated in the step (2) smoothed by weighted averaging by the correlation, wherein the motion vectors between the reference image and the target image are calculated by using the finally calculated motion vectors of the resolution level L as input motion vectors of a resolution level L-1, which is a higher resolution, and by repeating the processing for estimating motion vectors per resolution on image data having higher resolutions sequentially.

\* \* \* \* \*